June 23, 1959     G. G. RICHMOND     2,891,374
COMBINATION GRASS RAKE AND GRABBER
Filed April 7, 1958

GEORGE G. RICHMOND
INVENTOR

BY *Carl Miller*
ATTORNEY

United States Patent Office 2,891,374
Patented June 23, 1959

2,891,374

COMBINATION GRASS RAKE AND GRABBER

George G. Richmond, Cambria Heights, N.Y.

Application April 7, 1958, Serial No. 726,991

1 Claim. (Cl. 56—400.12)

This invention relates to tools and, more particularly, to a tool for lawns and gardens.

Ordinarily, it is necssary to first rake together cut grass and fallen leaves before such are placed into a receptacle, burned, or otherwise disposed of. This, of course, necessitates the use of the hands or other suitable device for grasping the pile of grass or leaves for lifting it into the trash bucket, fire, or the like. It is therefore an object of the present invention to provide a combination leaf and grass rake and grabber that can be used for various types of lawns, gardens, and play areas that is extremely simple in construction, efficient in operation, and which will enable such work to be accomplished in a simple and efficient manner.

Another object of the present invention is to provide a lawn and garden tool that will accomplish the foregoing tasks in a minimum amount of time and without the necessity of having to soil the hands.

Still a further object of the present invention is to provide a lawn and garden tool of the type described that can be manufactured in large quantities at relatively low cost, and which can be effectively used by men and women alike.

All of the foregoing and still further objects and advantages of this invention will become apparent from a study of the following specification, taken in connection with the accompanying drawing, wherein.

Figure 1:
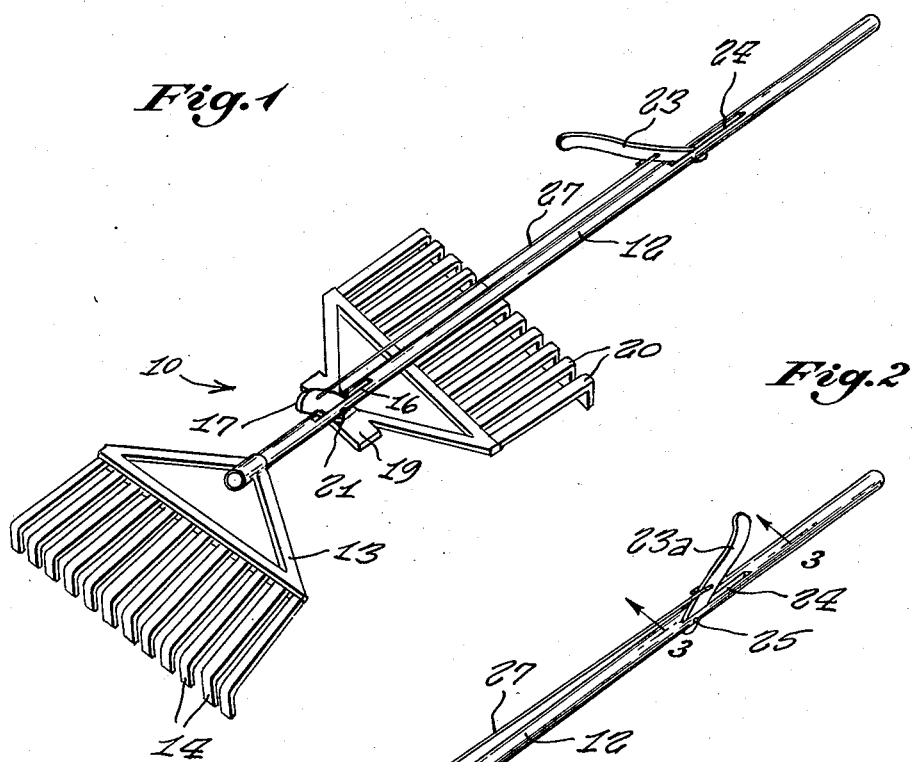
Figure 1 is a perspective view of a lawn and garden tool made in accordance with the present invention in a normal operating position.
Figure 2:
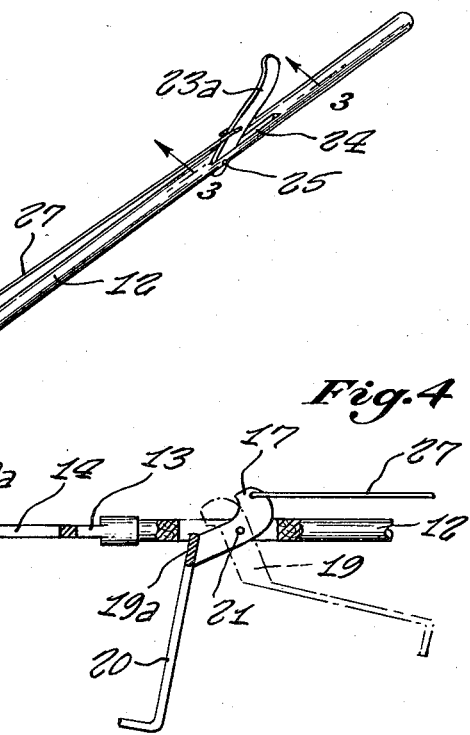
Figure 2 is a view similar to Figure 1, showing the parts in an adjusted position.
Figure 4:
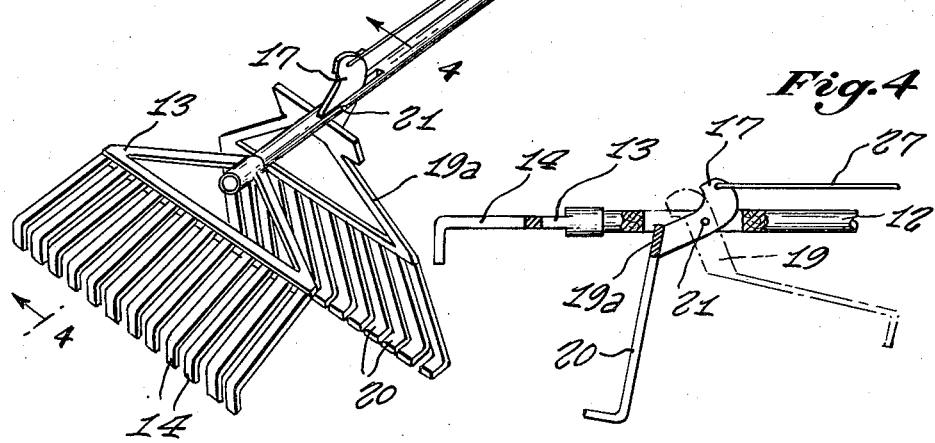
Figure 4 is an enlarged fragmentary longitudinal cross sectional view taken along line 4—4 of Figure 2.
Figure 3:
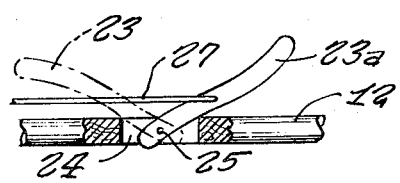
Figure 3 is an enlarged fragmentary longitudinal cross sectional view taken along line 3—3 of Figure 2.

With reference now to the drawing, and more particularly to Figures 1 and 2 thereof, a combination leaf grass rake and grabber 10 made in accordance with the present invention is shown to include an elongated handle 12 having a stationary frame 13 and tines 14 secured to one end. A longitudinal slot 16 in the handle 12 immediately behind the stationary frame 13 rotatably receives a crank 17 that lies in a plane normal to the plane of an adjustable frame 19 and tines 20. A transversely extending pivot pin 21 secures the adjustable unit upon the handle for rotation between a normally open position illustrated in Figure 1 in which the stationary frame 13 and tines 14 are used as a conventional garden rake, and fully closed position in flat face engagement with the stationary frame 13 and tines 14 for clamping a pile of leaves or grass therebetween for lifting such pile into a receptacle.

A lever 23 is received within a longitudinal slot 24 adjacent the opposite end of the handle 12. A transverse pivot pin 25 pivotally supports this lever 23 within the slot 24 for reciprocating longitudinal pivotal movement. A rigid rod 27 is secured at one end to the mid section of the lever 23 and at the opposite end to the free end of the crank 17. It will thus be recognized that by pulling the lever 23 rearwardly toward a rearwardly inclined position 23a, the rearward movement of the free end of the crank 17 will effect corresponding rotational movement of the adjustable frame 19 toward a closing position 19a with the stationary frame 13. It will thus be appreciated that the tool is readily used as a combination tool for raking loose leaves and grass and for lifting and carrying formed piles thereof for disposal purposes.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

A combination leaf and grass rake and grabber, including the combination of an elongated straight rigid handle having a pair of alined slots individually extending transversely through the handle a short distance within each end of the latter, said slots being also disposed in the same plane, a triangular open frame secured upon one end of the handle beyond the slot adjacent to said end in line with said handle with one side of the frame longer than the other two and spaced from the end and the frame as a whole being disposed in a plane at right angles to the plane of the slots, the longer side of said frame being disposed at right angles to the longitudinal dimension of said handle and having a series of parallel tines extending rigidly therefrom in the plane of said frame and extending remotely from said handle, said tines having a short end portion upon each bent substantially at right angles to the main portion of the tines, a manually operable lever extending upwards from within the slot remote from the frame bearing the tines, a pivot pin extending transversely through the handle and slot with the lever for retaining said lever in said slot, a crank extending down through the other slot a short distance from said frame with a second pivot pin extending transversely through said handle and said other slot and said crank, a rigid rod interconnecting the exposed end of the crank and the lever within the exposed end thereof, a second frame of substantially triangular form secured to the crank upon the side of said handle opposite to that upon which the rod interconnects the crank and lever, the second frame being flat and having one side parallel to the pivot pin extending through the crank carrying the latter frame, a second series of tines extending rigidly from said one side in the plane thereof but at right angles thereto, a short end portion of each of the second series being bent at substantially right angles in opposed direction to that of the first series of tines in effective manner to co-operate therewith for gripping a quantity of grass and retaining it between said series of tines.

References Cited in the file of this patent

UNITED STATES PATENTS

| 1,160,282 | Harris et al. | Nov. 16, 1915 |
| 2,136,849 | Hembree | Nov. 15, 1938 |
| 2,373,872 | Couture | Apr. 17, 1945 |
| 2,746,234 | Utley | May 22, 1956 |